(12) United States Patent
Lopez

(10) Patent No.: US 11,952,125 B2
(45) Date of Patent: Apr. 9, 2024

(54) MOVABLE SHROUD FOR ARTICULATING COMPONENTS

(71) Applicant: SAFRAN SEATS USA LLC, Gainesville, TX (US)

(72) Inventor: Juan Francisco Lopez, Chihuahua (MX)

(73) Assignee: SAFRAN SEATS USA LLC, Gainesville, TX (US)

( * ) Notice: Subject to any disclaimer, the term of this patent is extended or adjusted under 35 U.S.C. 154(b) by 18 days.

(21) Appl. No.: 17/571,205

(22) Filed: Jan. 7, 2022

(65) Prior Publication Data
US 2023/0219688 A1 Jul. 13, 2023

(51) Int. Cl.
*B64D 11/06* (2006.01)
*B60N 3/00* (2006.01)
*B60R 7/04* (2006.01)

(52) U.S. Cl.
CPC .......... *B64D 11/0638* (2014.12); *B60N 3/004* (2013.01); *B60R 7/04* (2013.01)

(58) Field of Classification Search
CPC .. A47C 7/70; B60N 3/004; B60R 7/04; B64D 11/0638
USPC ................................................ 297/146, 124
See application file for complete search history.

(56) References Cited

U.S. PATENT DOCUMENTS

| | | | | |
|---|---|---|---|---|
| 2,132,279 A | * | 10/1938 | Wicknick | B60N 3/004 297/146 |
| 3,319,697 A | * | 5/1967 | Krohn | E06B 7/367 160/229.1 |
| 4,726,621 A | * | 2/1988 | Muller | B61D 33/00 297/146 |
| 5,362,131 A | | 11/1994 | Susko et al. | |
| 6,494,533 B1 | * | 12/2002 | Bohler | B60N 3/004 297/188.05 |
| 6,698,492 B2 | * | 3/2004 | Lewis, Jr. | E05D 15/242 160/40 |
| 6,776,455 B2 | | 8/2004 | Longtin et al. | |
| 9,452,717 B2 | | 9/2016 | Dry et al. | |
| 9,925,895 B2 | * | 3/2018 | Ellis | B60N 2/767 |
| 9,969,311 B2 | | 5/2018 | Stewart et al. | |
| 10,017,256 B2 | * | 7/2018 | Byers | B64D 11/0646 |
| 10,745,951 B2 | * | 8/2020 | Wunderle | E05D 15/242 |
| 2007/0283855 A1 | * | 12/2007 | Pozzi | A47B 23/043 108/44 |
| 2015/0108798 A1 | * | 4/2015 | Boyer, Jr. | B64D 11/00152 297/188.05 |
| 2017/0355465 A1 | * | 12/2017 | Trimble | B60N 3/004 |

(Continued)

FOREIGN PATENT DOCUMENTS

WO WO-2017048319 A1 * 3/2017 ............... B60N 2/79

OTHER PUBLICATIONS

International Search Report and Written Opinion of the International Searching Authority dated Apr. 26, 2023, issued in corresponding International Application No. PCT/US2023/010140, filed Jan. 4, 2023, 8 pages.

*Primary Examiner* — Jose V Chen
(74) *Attorney, Agent, or Firm* — Christensen O'Connor Johnson Kindness PLLC

(57) ABSTRACT

A movable close-out shroud suitably configured to substantially cover, partially block, or otherwise close out an articulating opening to a cavity, void, etc., of a first part, such as a passenger seat section. The close-out shroud is configured to move between a stored position and a close-out position.

17 Claims, 9 Drawing Sheets

(56) References Cited

U.S. PATENT DOCUMENTS

| | | | | |
|---|---|---|---|---|
| 2018/0118059 A1* | 5/2018 | Watanabe | ................ | B60N 2/36 |
| 2018/0186458 A1* | 7/2018 | Kretzschmar | .......... | B60N 3/004 |
| 2018/0229848 A1* | 8/2018 | Murray | ................. | B60N 3/004 |
| 2021/0316867 A1* | 10/2021 | Ruiz Lara | .......... | B64D 11/0638 |
| 2021/0347486 A1* | 11/2021 | Arroum | ................ | B60N 3/004 |
| 2022/0063470 A1* | 3/2022 | Berg | ....................... | B60R 7/043 |

\* cited by examiner

MOVABLE SHROUD FOR ARTICULATING COMPONENTS

FIELD OF DISCLOSURE

The present disclosure relates to articulating components. More particularly, the present disclosure relates to articulating components associated with a passenger seat, such as a seat section coupled to a support, such as an arm rest, a tray table, a portable electronic device (PED) support, etc. The present disclosure also relates to a movable shroud that partially blocks, covers, or otherwise closes out an articulating opening of the passenger seat caused by the articulating components.

BACKGROUND

Passenger seats on common carriers (such as buses, trains, ships, and aircraft) often utilize arm rests, foot rests, tray tables, back rests, displays, leg rests, portable electronic device (PED) supports, or other similar types of translating or pivoting (e.g., moving) components. For example, arm rests, tray tables and portable electronic device (PED) supports are typically mounted to passenger seats in an articulated (e.g., pivotal) manner. In use, these components may be rotated between stowed and deployed positions.

Oftentimes these articulating components expose cavities or voids that change in shape, create pinch points, etc., due to their relative mating positions. Such cavities or voids, pinch points, etc., formed between such articulating components may pose a hazard to passengers, may damage passenger belongings, or may need to be otherwise blocked to prevent passenger tampering, ingress of dust and debris, etc.

For example, U.S. Pat. No. 9,925,895, which is presently assigned to Safran Seats USA LLC, discloses an arm rest pivotally mounted to a passenger seat. The arm rest may be rotated aft into a substantially vertical (or stowed) position, and rotated forward into a substantially horizontal (or deployed) position. This rotation of the arm rest into the deployed position can create a pinch point between components of the arm rest and/or passenger seat. In an effort to eliminate or reduce the potential risks associated with the pinch point, a stationary close-out shroud can be added, which bends with the arm rest to prevent access to such cavities or voids.

The industry is continually striving for new designs or arrangements that address risks posed by articulating components.

SUMMARY

The present disclosure provides examples of a movable shroud that addresses potential risks posed by various arrangements of articulating components. As will be described in more detail below, examples of the movable shroud are suitable for use with passenger seats, and in certain embodiments, with a hinge that couples a first part of a passenger seat, such as a seat back, to a second part, such as a portable electronic device (PED) support. In some embodiments, the moveable shroud is configured for partially blocking, covering or otherwise closing out an articulating opening associated with the articulating components of a passenger seat.

In accordance with an aspect of the present disclosure, a passenger seat is provided. In an embodiment, the passenger seat includes a seat section, a support coupled to the seat section and configured to reciprocate between a stowed position and a deployed position, and a shroud associated with the seat section and movable between a stored position and a close-out position as the support moves between the stowed position and the deployed position.

In any of the embodiments of the passenger seat, the support may include an outer surface that is flush with the seat section when the support is in the stowed position and is positioned at a non-zero angle with respect to the seat section when the support is in the deployed position.

In any of the embodiments of the passenger seat, the shroud may be disposed substantially within the seat section in the stored position and extends exteriorly of the seat section in the close-out position.

In any of the embodiments of the passenger seat, the shroud, in the close-out position, closes out an articulating opening associated with the seat section.

In these or other embodiments, the passenger seat further comprises a hinge configured to pivotally couple the support to the seat section, wherein the hinge includes a hinge arm extending though the articulating opening and having a first end pivotally mounted to the seat section and a second end fixed to the support.

In any of the embodiments of the passenger seat, the hinge arm may include a first contact surface that engages the shroud when the support is in a first intermediate position located between the stowed position and the deployed position, wherein engagement between the first contact surface and the shroud drives the shroud to move with the hinge arm as the support moves from the first intermediate position to the deployed position.

In any of the embodiments of the passenger seat, the hinge arm or the support may include a second contact surface that engages the shroud when the support is in a second, intermediate position located between the stowed position and the deployed position, wherein engagement between the second contact surface and the shroud drives the shroud to move with the hinge arm or the support as the support moves from the second intermediate position to the stowed position.

In any of the embodiments of the passenger seat, the hinge arm may include a curvilinear section that includes the first end, wherein the first curvilinear section nests within the shroud when the shroud is in the stored position, and wherein the first curvilinear section includes at least the first contact surface.

In any of the embodiments of the passenger seat, the support may be selected from a group consisting of a tray, a portable electric device (PED) holder, and an arm rest.

In accordance with another aspect of the present disclosure, an assembly is provided. In an embodiment, the assembly includes a first part having an opening that provides access interiorly of the first part, a second part having a support surface, and a hinge pivotally coupling the second part to the first part such that the second part is movable between a first position and a second position. In an embodiment, the hinge may comprise a hinge arm pivotally coupled to the first part at a first end and fixed to the second part at a second end. The hinge arm extends through the opening such that the second end of the hinge arm is disposed externally of the first part. The assembly may also include a close-out shroud movably associated with the first part and configured to partially block said opening as said second part moves from the first position to the second position.

In any of the embodiments of the assembly, the first part is a passenger seat and the second part is a support selected from the group of supports consisting of an arm rest, a tray table, and a portable electronic device (PED) support, and wherein the first position is a stowed position and the second position is a deployed position.

In any of the embodiments of the assembly, the hinge arm may include a first contact surface that engages the close-out shroud when the support is in a first intermediate position located between the stowed position and the deployed position, wherein engagement between the first contact surface and the close-out shroud drives the close-out shroud to move with the hinge arm as the support moves from the first intermediate position to the deployed position.

In any of the embodiments of the assembly, the hinge is selected from the group consisting of a free hinge and a torque hinge.

In any of the embodiments of the assembly, the hinge is a free hinge, and wherein the deployed position is defined by a mechanical stop associated with at least one of the passenger seat or the hinge, the support positioned at a non-zero angle with respect to a section of the passenger seat when the support is in the deployed position.

In accordance with another aspect of the present disclosure, a passenger seat is provided. In an embodiment, the passenger seat includes a seat back having an opening that provides access to an interior of the seat back, a support having a support surface, and a hinge pivotally coupling the support to the seat back such that the support moves between a stowed position, in which the support surface is substantially flush with a portion of the seat back, and a deployed position, in which the support surface extends at a non-zero angle with respect to the seat back. In an embodiment, the hinge includes a hinge arm having a first end coupled to a movable section of the hinge disposed in the interior of the seat back and a second end coupled to the support. The hinge arm extends through the opening such that the second end is disposed externally of the seat back and causes a gap formed between the hinge arm and the opening in the seat back to vary in size via movement of the support. The passenger seat also includes a shroud configured to substantially close out the gap when the support is in the deployed position.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth above in connection with the appended drawings, where like numerals reference like elements, are intended as a description of various embodiments of the present disclosure and are not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result. Moreover, some of the method steps can be carried serially or in parallel, or in any order unless specifically expressed or understood in the context of other method steps.

As will be described in more detail below, the present disclosure provides examples of a movable close-out shroud suitably configured to substantially cover, partially block or otherwise close out an articulating opening to a cavity, void, etc., of a first part, such as a passenger seat section. For example, openings to cavities, for example, in a passenger seat section may have a shape that changes, create pinch points, etc., due to the relative mating positions of the moving components (e.g., arm rests, foot rests, tray tables, back rests, displays of the passenger seat, etc.). These varyingly shaped openings, also referred to as articulating openings, may pose a hazard to passengers, may damage passenger belongings, or may need to be otherwise blocked to prevent passenger tampering, ingress of dust and debris, etc.

Although embodiments of the present disclosure may be described with reference to an aircraft passenger seat, one skilled in the relevant art will appreciate that the disclosed embodiments are illustrative in nature and therefore should not be construed as limited to such an application. It should therefore be apparent that the disclosed technologies and methodologies have wide application, and therefore may be suitable for use with many types of articulating arrangements, including seats of any type, such as passenger seats employed in buses, trains, ships, and the like. Accordingly, the following descriptions and illustrations herein should not limit the scope of the claimed subject matter.

Figure 1A:
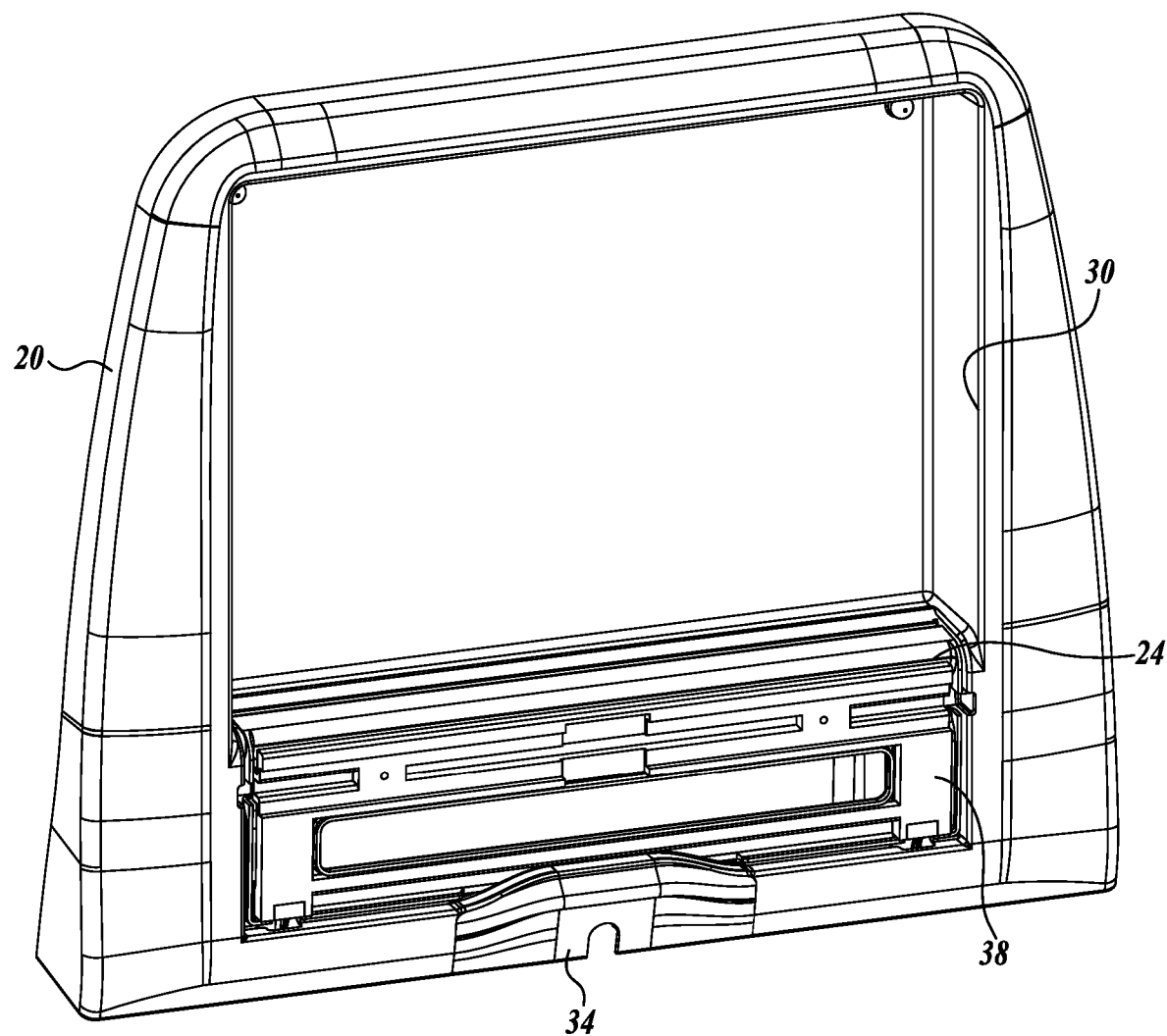
FIGS. 1A and 1B depict one example of an environment, such as a passenger seat, in which technologies and/or methodologies of the disclosure may be employed.
Figure 1B:
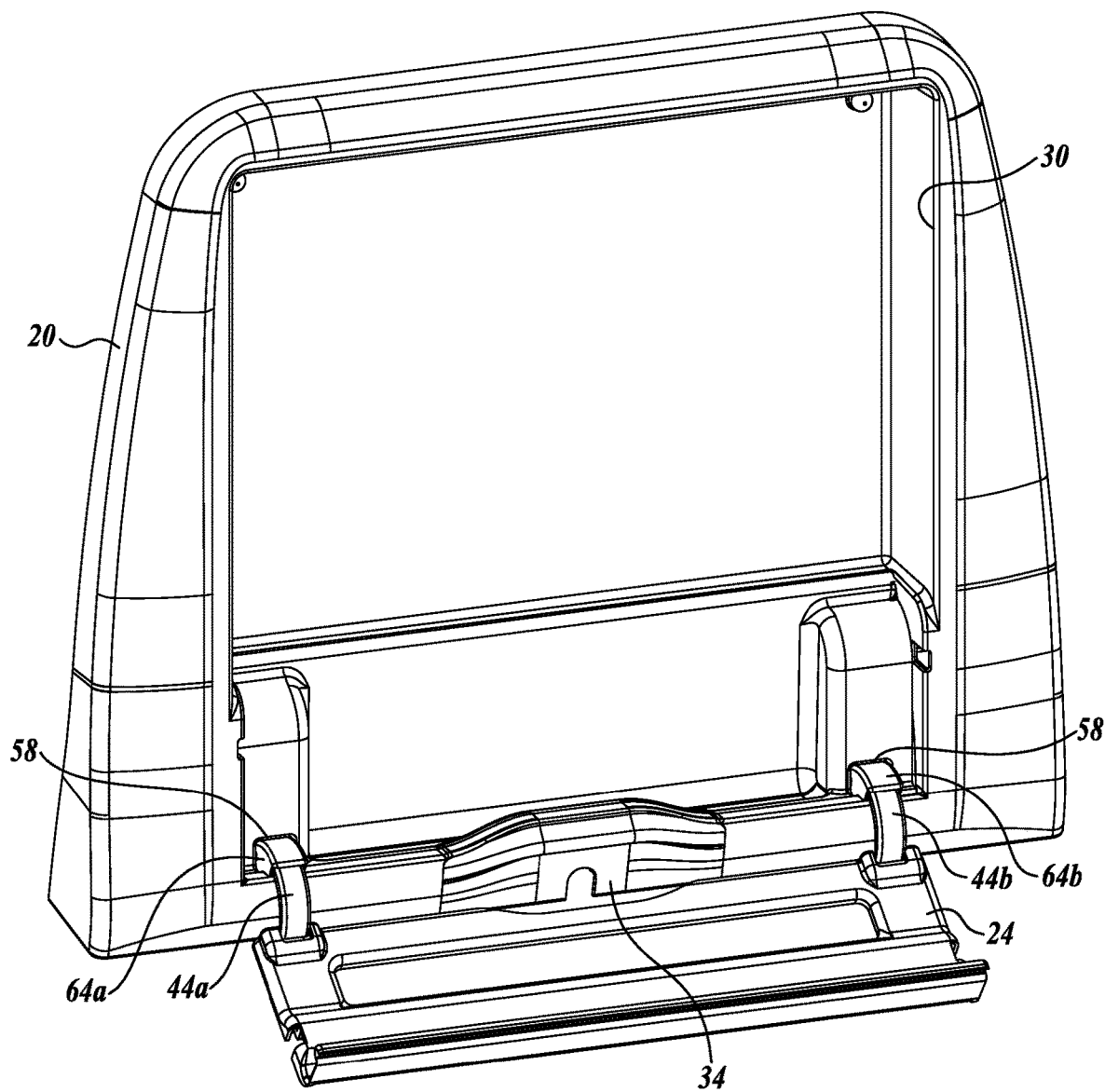
Figure 2:
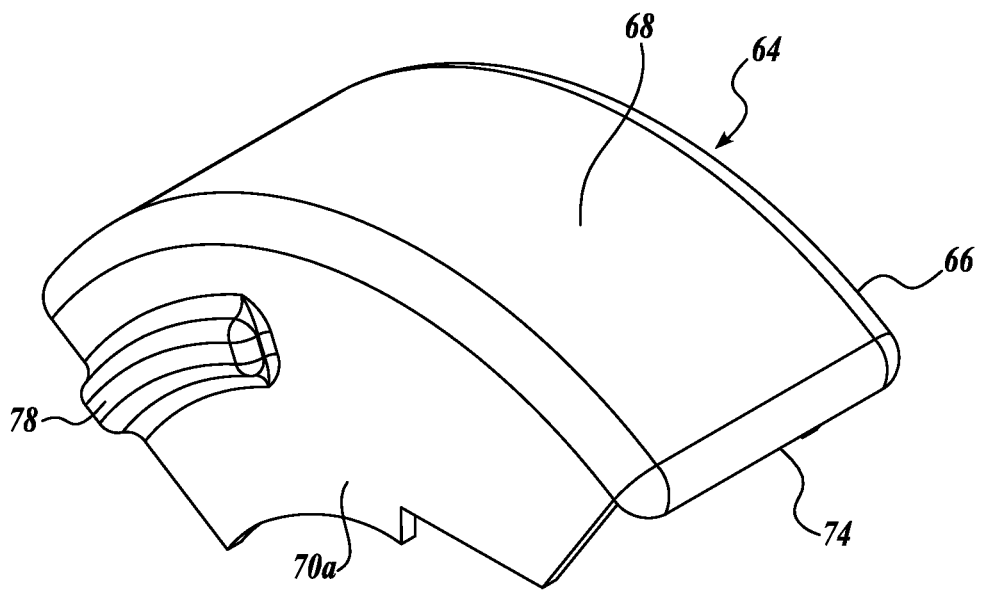
FIGS. 2 and 3 are top and bottom perspective views of one embodiment of a shroud formed in accordance with an aspect of the present disclosure.
Figure 3:
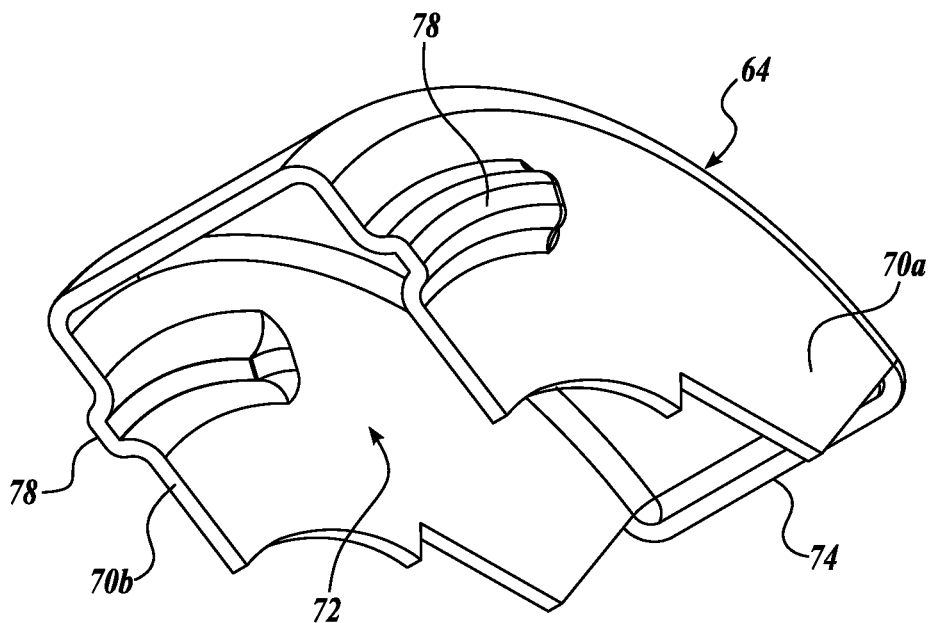
Figure 4:
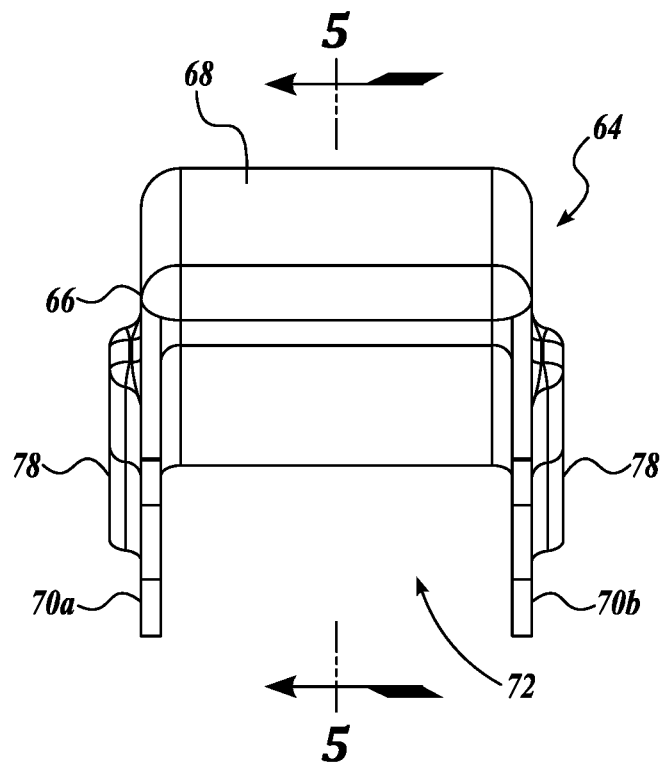
FIG. 4 is a front view of the shroud shown in FIGS. 2 and 3.
Figure 5:
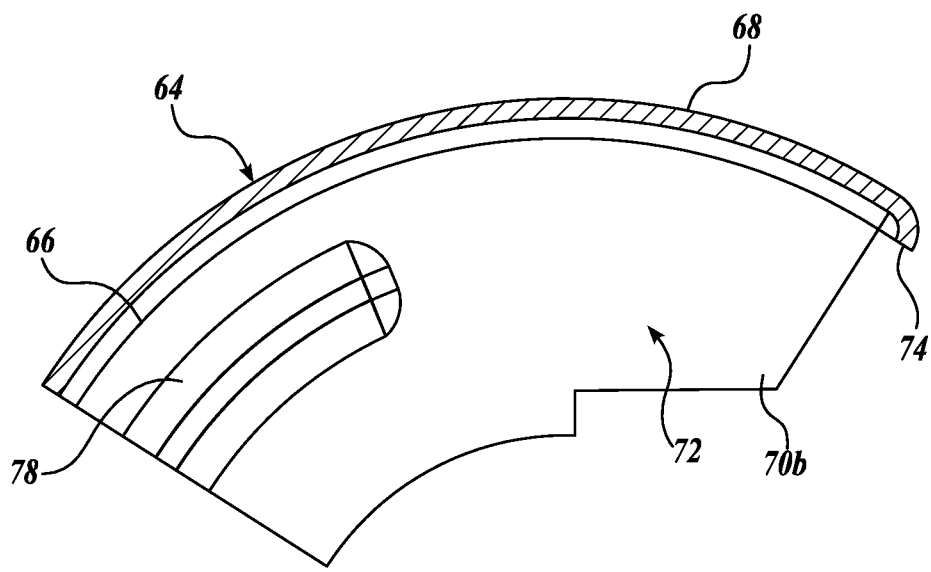
FIG. 5 is a cross-sectional view of the shroud taken through line 5-5 in FIG. 4.

FIGS. 1A and 1B depict one example of an environment, such as a passenger seat, in which technologies and/or methodologies of the disclosure may be employed. In the embodiment of FIGS. 1A and 1B, there is shown a first part of a passenger seat, such as an upper seat back 20, suitable for use in a passenger vehicle, such as an aircraft, a bus, an RV, a ship, among others. As shown in FIGS. 1A and 1B, a second part in the form of a support 24 is coupled to the seat back 20 and movable between a stowed position, shown in FIG. 1A, and a deployed position, shown in FIG. 1B. In the embodiment shown, the support 24 is configured to support or hold, for example, a portable electronic device (PED), a book, a beverage, a food tray, etc., in the deployed position.

In some embodiments, as illustrated in FIGS. 1A and 1B, the seat back 20 includes a video shroud 30 suitable for mounting a monitor (not shown). The seat in general or the seat back 20 in particular may include many other features not shown for ease of illustration but well known in the art.

For example, the seat may include an optional tray table that pivots between a stowed position, in which the tray table is positioned adjacent the seat back 20, and a deployed position, in which the tray table is spaced apart from the seat back 20 such that a passenger can place articles on the tray table. A latch component or coupler 34 may be employed to interface with the tray table to maintain the tray table in the stowed position when not in use. The seat may also include other features, such as an optional literature pocket positioned on the seat back 20 or other location, which provides space for a passenger to store various items, for example, magazines and books.

Of course, it will be appreciated that the certain seat back 20 illustrated in FIGS. 1A and 1B should not be considered limiting on the present disclosure, and the support 24 may be coupled to various other types of seat backs with fewer or additional features as desired. In addition, the particular location of the support 24 on the seat back 20 illustrated in FIGS. 1A and 1B should not be considered limiting on the present disclosure, as the support 24 may be positioned at various locations on the seat back 20 and/or at various locations relative to other components on the seat back 20.

For example, the support 24 in the embodiment shown in FIGS. 1A and 1B is positioned on the seat back 20 below the video shroud 30. As illustrated, in this example, the support 24 may be positioned such that the support 24 is located above the optional tray table when the tray table is in the stowed position thereby allowing a passenger access to the support 24 when the tray table is in the stowed position. As mentioned, in other examples, the support 24 may be at various other positions on the seat back 20 and/or relative to other components on the seat back 20 as desired.

In some embodiments, the support 24 may be moved between a variety of positions including, but not limited to, a stowed position (FIGS. 1A and 6A), a number of intermediate positions (e.g., FIGS. 6B and 6D), a deployed position (FIGS. 1B and 6C), and positions there-between. In some embodiments, the support 24 may be configured to move in a restricted manner or an indexed manner between the various positions mentioned above. In other embodiments, the support 24 may be configured to freely move between the stated positions.

As illustrated, for example in FIG. 1A, when the support 24 is in the stowed position, the support 24 may be positioned proximate the seat back 20. In this example, a back (e.g., non-device supporting) surface 38 of the support 24 may be substantially flush with at least a portion of the seat back 20. In some embodiments, the support 24 may be oriented somewhat vertically with respect to a floor on which the passenger seat is mounted. In the intermediate positions and the deployed position, as illustrated, for example in FIGS. 1B and 6B-6D, the support 24 may be spaced apart from the seat back 20 in an aft direction and oriented at a non-zero angle with respect to the seat back 20.

As briefly described above, the support 24 is coupled for movement to the seat back 20. In some embodiments, and as illustrated, for example, in FIGS. 1B, 6A-6D, and 7, the support 24 is pivotally coupled for movement to the seat back 20 via a hinge 40. In some embodiments, the hinge 40 comprises at least one hinge arm 44 fixed at a first end 46 to a movable section of the hinge 40, such as for example a hinge or pivot shaft 48, and fixed at a second end 50 to the support 24. As such, the hinge arm 44 pivots about an axis 52 defined by the hinge 40. In a certain embodiment, as shown in FIGS. 6A-6D and 7, the pivot shaft 48 of the hinge 40 is disposed in a cavity within the seat back 20. In other words, the pivot shaft 48 of the hinge 40 is disposed interiorly of seat back 20.

In some embodiments, the hinge 40 may be of the torque hinge type, and thus, includes structure, such as springs, torsion bars, etc., for arresting movement of the support 24 as it transitions from the stowed position to the deployed position. In a certain embodiment, the hinge 40 is configured to maintain the support 24 in the stowed position without additional latching, etc. In other embodiments, the hinge 40 may be of the free hinge type. For example, the pivot shaft 48 may be arranged to freely rotate without restriction about a bearing surface of the hinge 40. In these embodiments, the deployed position of the support, and in some embodiments the stowed position of the support, may be defined by a mechanical stop. For example, in the embodiment shown in FIG. 7, rotation of the pivot shaft 48 is restricted between the stowed position (FIG. 6A) and the deployed position (FIG. 6C) via a projection 54 of the pivot shaft 48, which is trapped within a cage-like structure 56. At either end of the movement of the support 24, the trapped projection 54 abuts against an inside wall of the structure 56, thereby limiting the range of motion of the support 24. Of course, the mechanical stops can be employed with any type of hinge utilized by embodiments of the present disclosure. The hinge 40 in some embodiments may be additionally or alternatively configured with an indexing mechanism to index the movement of the support 24 to the stowed and/or the deployed positions.

Figure 6A:
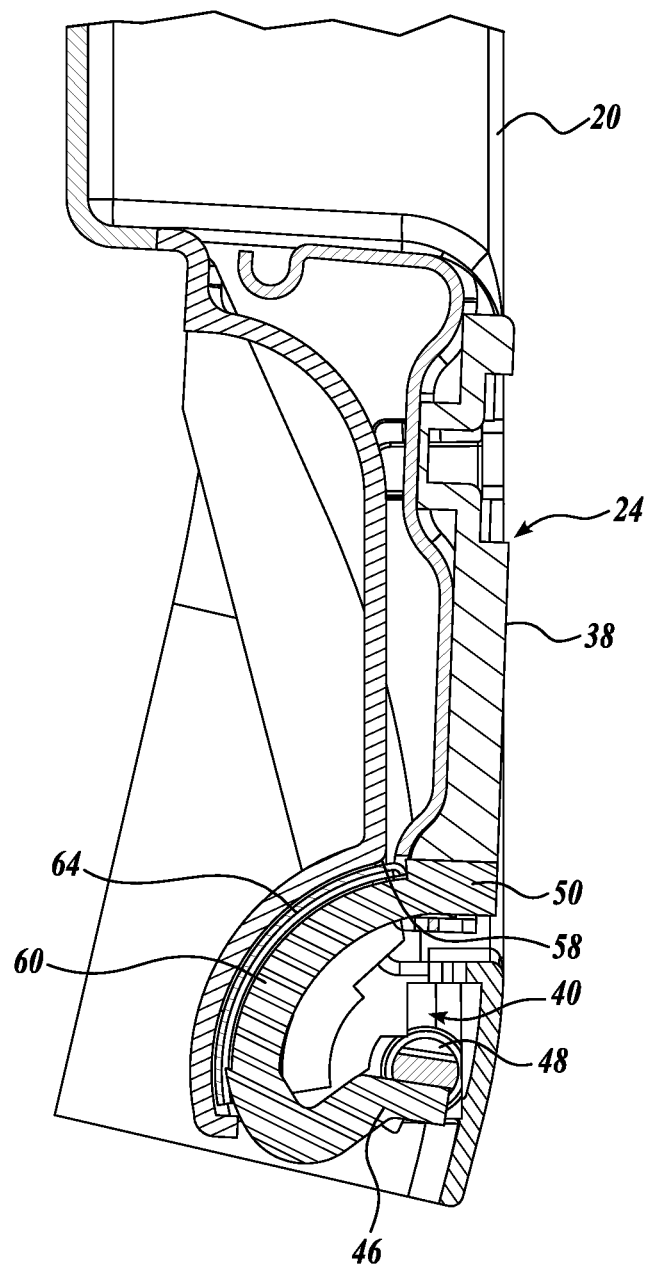
FIGS. 6A-6D depict one embodiment of the shroud associated with a passenger seat having a support coupled to a seat section.

When the embodiment of FIGS. 6A-6D is assembled, the hinge arm 44 extends from the first end 46 located within a cavity of the seat back 20, through an opening 58 formed in the seat back 20, and to the second end 50 located exteriorly of the seat back 20. In the embodiment illustrated in FIGS. 6A-6D, the first end 46 of the hinge arm 44 is part of a curvilinear section 60. As shown in FIG. 6A, the seat back 20 is configured to encase or envelope the curvilinear section 60 of the hinge arm 44 while allowing a pivoting-type movement therebetween.

In the deployed position, the support 24 in a certain embodiment is configured to hold or support thereon a portable electronic device (PED). In that regard, the aft facing end of the support 24 may include an upturned flange 62 or the like forming a C-shaped channel dimensioned to receive the bottom end the portable electronic device (PED). Of course, the portable electronic device (PED) may be any various suitable portable electronic devices (PEDs) including, but not limited to, tablet computers, cell phones, smart phones, handheld video game systems, personal digital assistants, palmtop computers, DVD players, data and audio-video media, multi-media enabled devices, and/or other similar electronic devices.

In some examples, the support 24 is coupled to the seat back 20 via a single hinge 40. However, any number of hinges 40 can be employed in embodiments of the disclosure. For example, in the embodiment of FIGS. 1A-1B, first and second hinges are provided with first and second arms 44a, 44b disposed on each side of the support 24. In other embodiments, a single hinge may employ two hinge arms 44a, 44b.

While the opening 58 in the embodiment shown in FIGS. 1B and 6B-6D allows for the hinge arm 44 to extend exteriorly of the seat back 20 from within the seat back 20, such a configuration may cause unattended consequences or poses risks to passengers or property during use of the support 24. For example, a gap 59 may be generated between the walls that define the opening 58 to the cavity and the hinge arm 44 as the support 24 moves relative to the seat back 20. The shape/size of this gap 59, also referred to as the articulating opening 59, may also change due to relative mating positions of the articulating components during movement of the support 24. This articulating opening 59 may pose a hazard to passengers, may damage passenger belongings, or may need to be otherwise blocked to prevent passenger tampering, ingress of dust and debris, etc.

To alleviate any problems associated with the articulating opening 59, a shroud, generally designed 64, is provided in accordance with an aspect of the present disclosure. In use, the shroud 64 covers, partially blocks or otherwise closes out the articulating opening 59 to the interior of the seat back 20. In certain embodiments, the shroud 64 moves between a stored position, in which for example the shroud 64 is enclosed by the seat back 20, and a close-out position, in which the shroud 64 extends exteriorly of the seat back 20 and substantially closes out or blocks the articulating opening 59. Closure of this articulating opening 59 may aid in the removal of a pinch point, the prevention of dirt and debris ingress, etc.

Turning now to FIGS. 2-5, there is shown one example embodiment of the shroud 64 in accordance with an aspect of the disclosure. As shown in FIGS. 2-5, the shroud 64 includes a shroud body 66 that includes a top wall 68 from which first and second side walls 70a, 70b downwardly depend to form an open-ended cavity 72. In the embodiment illustrated in FIGS. 6A-6D, the top wall 68 is arcuate or otherwise rounded in order to cooperate with the curvilinear section 60 of the hinge arm 44. In that regard, the curvilinear section 60 of the hinge arm 44 is configured to nest within the cavity 72 of the shroud 64 when the shroud 64 is in the stored position. The shroud 64 further includes a lip or flange 74 that extends from the aft facing end of the top wall 68, the purpose of which will be described in more detail below. In use, the shroud 64 is configured for covering, partially blocking or otherwise closing out articulating opening/gap when the support 24 is moved between the deployed position and the stowed position, as shown in FIGS. 1B and 6A-6D.

Optionally, the shroud 64 may include ribs or rails 78a, 78b extending laterally outwardly from the side walls 70a, 70b. The ribs or rails 78a, 78b are configured to interface with cooperating structure, such as cooperatingly shaped channels 80 (FIG. 6C), on the seat back 20 for guiding the movement of the shroud 64 between the stored position and the close-out position. Of course, the channels 80 instead may be formed on the shroud 64 and the ribs or rails 78 instead may be formed on the seat back 20.

To describe the movement of the shroud 64 with respect to the other components of the seat, attention is directed to FIGS. 6A-6D. FIGS. 6A-6D depict a sequence of deploying the support 24 from a stowed position (FIG. 6A) to a deployed position (FIG. 6C) and back to a stowed position (FIG. 6A). In-between the stowed position and the deployed position are first and second intermediate positions (FIGS. 6B and 6D), the significance of which will be described in more detail below. As shown in stowed position of FIG. 6A, the support 24, for example, is proximate the seat back 20 with the back surface 38 substantially flush with a portion of the seat back 20, and the shroud 64 is encased by the seat back 20.

In order to use the support 24, the support 24 is moved toward the deployed position. In doing so, the support 24 is moved through a non-zero angle with respect to the seat back 20. In the embodiment of FIGS. 6A-6D, the initial movement of the support 24 (and the hinge arm 44) is independent of the shroud 64. In other words, the shroud 64 does not move with the support 24 during this initial movement phase. Once the support 24 has attained the first intermediate position shown in FIG. 6B, a part of the hinge arm 44 engages with the flange 74 of the shroud 64. For example, in an embodiment, the hinge arm 44 includes a first contact surface 82 positioned on the top end thereof. In the embodiment illustrated in FIGS. 6A-6D, the contact surface 82 is formed by a stepped shoulder in the curvilinear section 60 of the hinge arm 44.

Figure 6B:
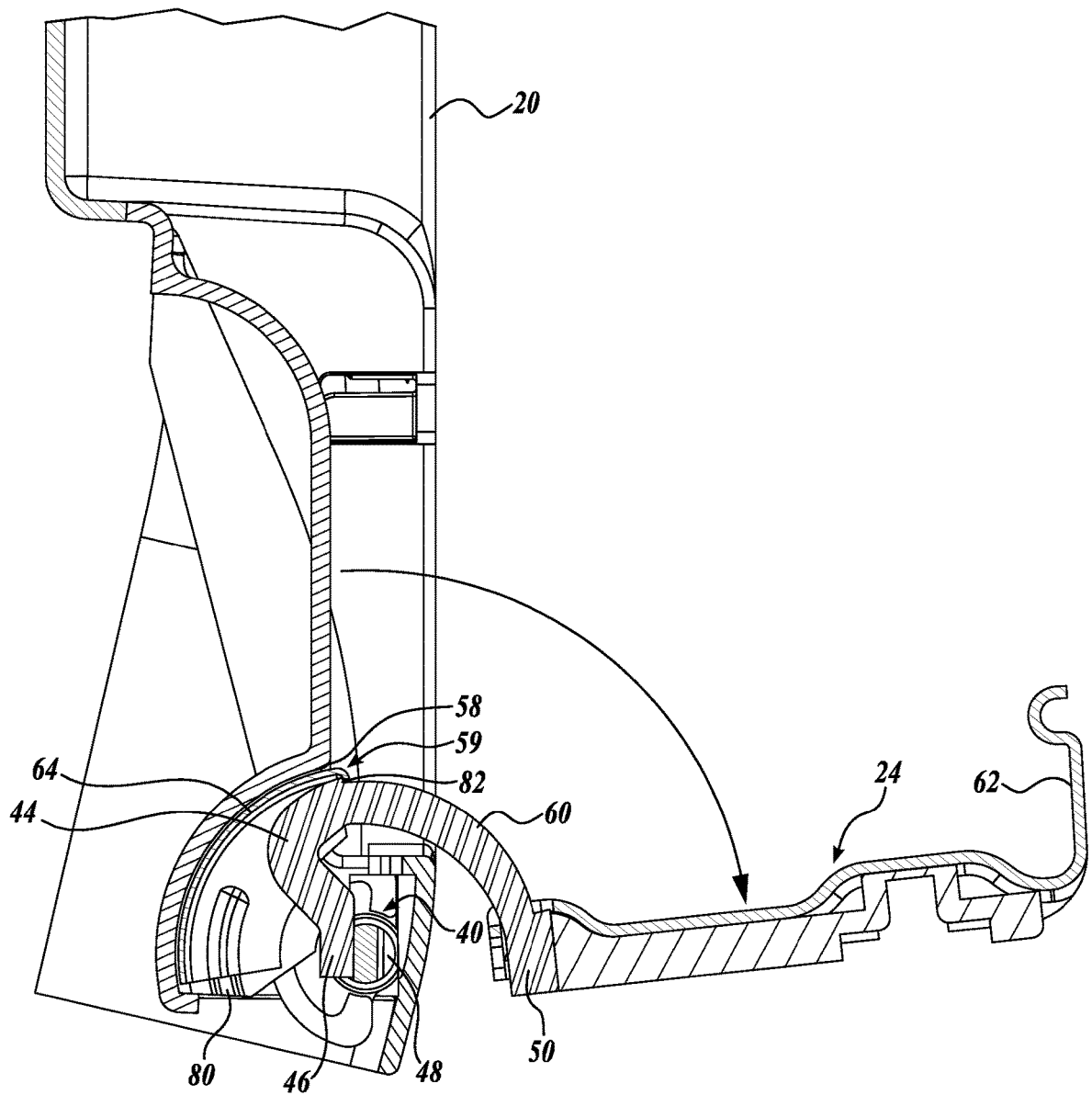
Figure 6C:
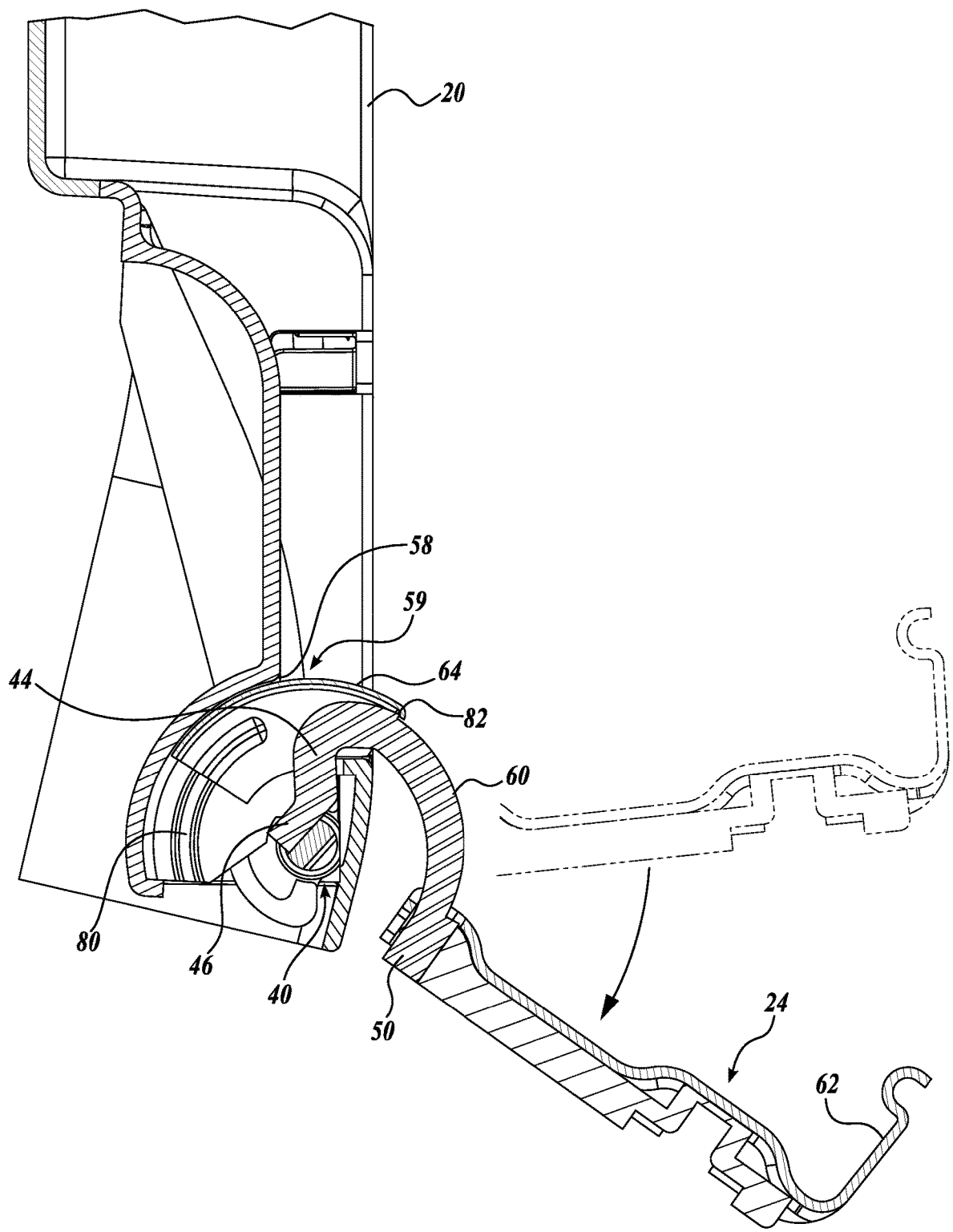

With continued movement of the support 24 from the first intermediate position of FIG. 6B to the deployed position of FIG. 6C, the first contact surface 82 of the hinge arm 44 continually engages the shroud 64 and drives the shroud 64 to move with the hinge arm 44 to the close-out position of the shroud 64. In the close-out position, the shroud 64 extends outwardly and exteriorly of the seat back 20 and covers, partially blocks or closes out the articulating opening 59. In the embodiment illustrated in FIGS. 6A-6D, the shroud 64 is in the close-out position when the support 24 is in the deployed position.

In order to stow the support 24 after use, the support 24 is moved forwardly toward the back seat 20. In doing so, the support 24 is moved with respect to the seat back 20 toward the stowed position. In the embodiment of FIGS. 6A-6D, the initial movement of the support 24 (and of the hinge arm 44) from the deployed position toward the stowed position is independent of the shroud 64. In other words, the shroud 64 does not move with the support 24 during this initial movement phase toward stowage. Once the support 24 has attained the second intermediate position shown in FIG. 6D, a part of either the hinge arm 44 or the support 44 engages with the flange 74 of the shroud 64. For example, in an embodiment, the hinge arm 44 includes a second contact surface 84 positioned on the top end thereof and adjacent the support 24. Alternatively, a portion of the support 24 may form the second contact surface 84.

Figure 6D:
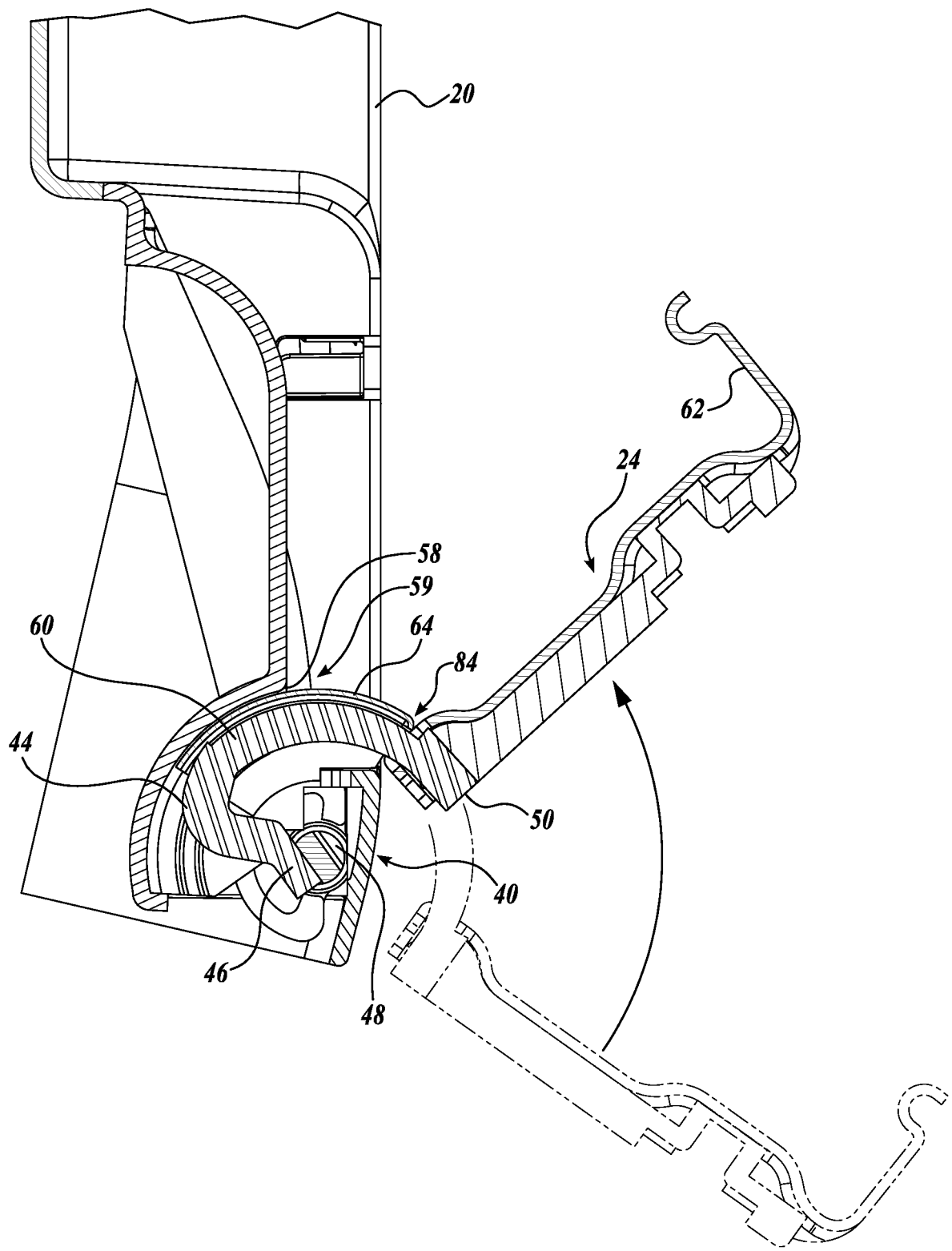
Figure 7:
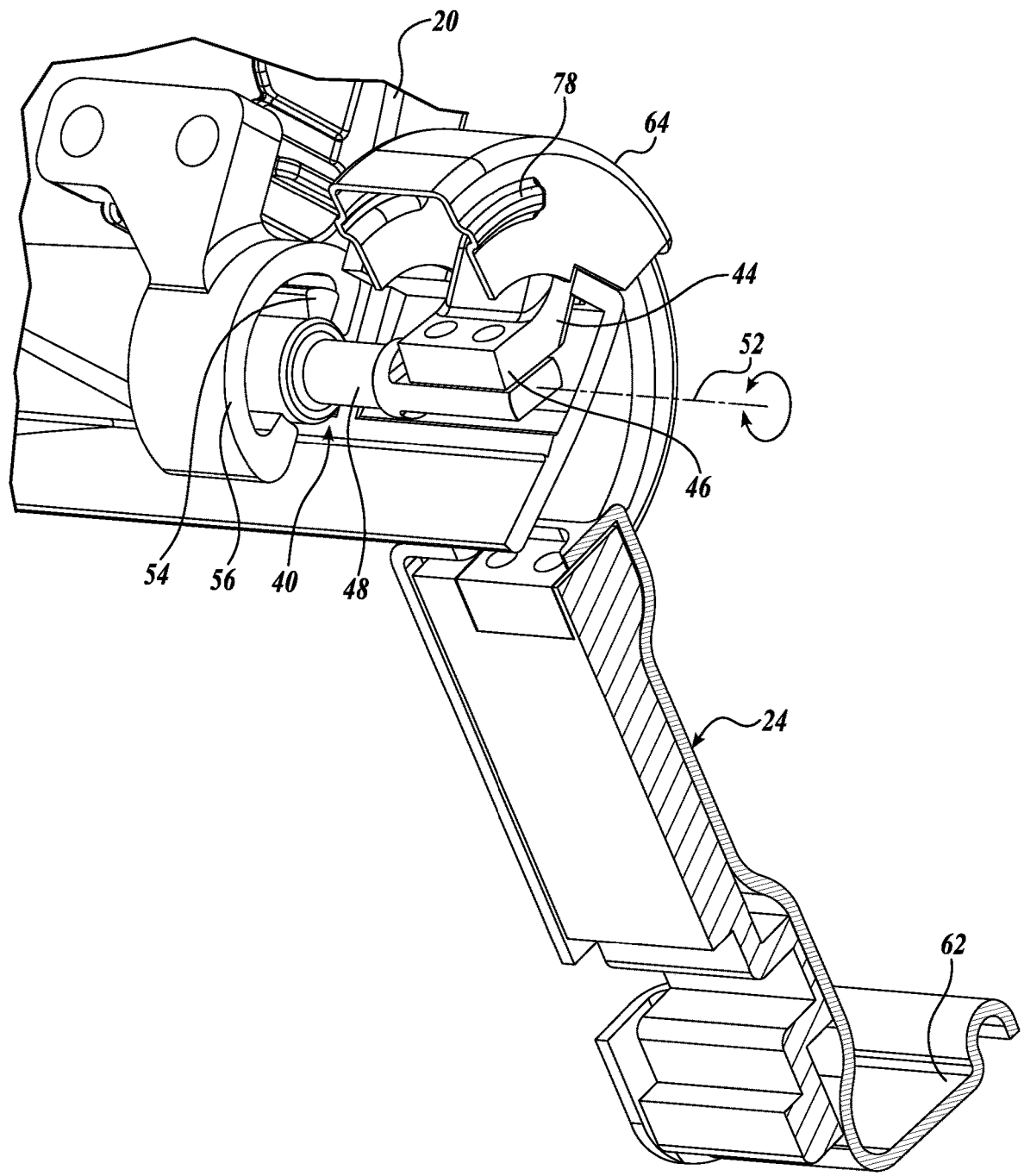
FIG. 7 depicts a partial view of a support pivotally coupled to a seat section via a representative embodiment of a hinge.

With continued movement of the support 24 from the second intermediate position of FIG. 6D to the stowed position of FIG. 6A, the second contact surface 84 continually engages the shroud 64 and drives the shroud 64 to move with the hinge arm 44 and the support 24 to the stored position of the shroud 64.

In the embodiment shown, the shroud 64 is formed as a rigid, unitary body. Alternatively, in other embodiments, the shroud 64 may include a flexible bellows, a rubber sleeve or boot, or the like. In other embodiments, the shroud may comprise a number of parts that nest within one another in the storage position and telescopingly extend in the close-out position. Other configurations of the shroud are possible, and are contemplated to be within the scope of the claimed subject matter.

In some embodiments, the shroud 64, the hinge arm 44, the support 24, and parts of the seat back 20 may be formed of various materials including, but not limited to, aluminum, stainless steel, aramid fibers, polycarbonate, polypropylene, other metallic materials, composite materials, combinations thereof, or any other suitable material. Any method of manufacture can be employed, including casting, molding, extruding, die cutting, 3D printing or other additive manufacturing techniques, etc.

A collection of exemplary embodiments, including at least some explicitly enumerated as "ECs" (Example Combinations), providing additional description of a variety of embodiment types in accordance with the concepts described herein are provided below. These examples are not meant to be mutually exclusive, exhaustive, or restrictive; and the claimed subject matter is not limited to these example embodiments but rather encompasses all possible modifications and variations within the scope of the issued claims and their equivalents.

EC A. A passenger seat, comprising: a seat section; a support coupled to the seat section and configured to reciprocate between a stowed position and a deployed position; and a shroud associated with the seat section and movable between a stored position and a close-out position as the support moves between the stowed position and the deployed position.

EC B. The passenger seat of any of the preceding or subsequent example combinations, wherein the support includes an outer surface that is flush with the seat section when the support is in the stowed position and is positioned at a non-zero angle with respect to the seat section when the support is in the deployed position.

EC C. The passenger seat of any of the preceding or subsequent example combinations, wherein the shroud is disposed substantially within the seat section in the stored position and extends exteriorly of the seat section in the close-out position.

EC D. The passenger seat of any of the preceding or subsequent example combinations, wherein the shroud, in the close-out position, closes out an articulating opening associated with the seat section.

EC E. The passenger seat of any of the preceding or subsequent example combinations, further comprising a hinge configured to pivotally couple the support to the seat section, the hinge including a hinge arm extending though the articulating opening and having a first end pivotally mounted to the seat section and a second end fixed to the support.

EC F. The passenger seat of any of the preceding or subsequent example combinations, wherein the hinge arm includes a first contact surface that engages the shroud when the support is in a first intermediate position located between the stowed position and the deployed position, wherein engagement between the first contact surface and the shroud drives the shroud to move with the hinge arm as the support moves from the first intermediate position to the deployed position.

EC G. The passenger seat of any of the preceding or subsequent example combinations, wherein the hinge arm or the support includes a second contact surface that engages the shroud when the support is in a second, intermediate position located between the stowed position and the deployed position, wherein engagement between the second contact surface and the shroud drives the shroud to move with the hinge arm or the support as the support moves from the second intermediate position to the stowed position.

EC H. The passenger seat of any of the preceding or subsequent example combinations, wherein the hinge arm includes a curvilinear section that includes the first end, wherein the first curvilinear section nests within the shroud when the shroud is in the stored position, and wherein the first curvilinear section includes at least the first contact surface.

EC I. The passenger seat of any of the preceding or subsequent example combinations, wherein the support is selected from a group consisting of a tray, a portable electric device (PED) holder, and an arm rest.

EC J. An assembly, comprising: a first part having an opening that provides access interiorly of the first part; a second part having a support surface; a hinge pivotally coupling the second part to the first part such that the second part is movable between a first position and a second position, the hinge comprising a hinge arm pivotally coupled to the first part at a first end and fixed to the second part at a second end, wherein the hinge arm extends through the opening such that the second end of the hinge arm is disposed externally of the first part; and a close-out shroud movably associated with the first part and configured to partially block said opening as said second part moves from the first position to the second position.

EC K. The assembly of any of the preceding or subsequent example combinations, wherein the first part is a passenger seat and the second part is a support selected from the group of supports consisting of an arm rest, a tray table, and a portable electronic device (PED) support, and wherein the first position is a stowed position and the second position is a deployed position.

EC L. The assembly of any of the preceding or subsequent example combinations, wherein the hinge arm includes a first contact surface that engages the close-out shroud when the support is in a first intermediate position located between the stowed position and the deployed position, wherein engagement between the first contact surface and the close-out shroud drives the close-out shroud to move with the hinge arm as the support moves from the first intermediate position to the deployed position.

EC M. The assembly of any of the preceding or subsequent example combinations, wherein the hinge is selected from the group consisting of a free hinge and a torque hinge.

EC N. The assembly of any of the preceding or subsequent example combinations, wherein the hinge is a free hinge, and wherein the deployed position is defined by a mechanical stop associated with at least one of the passenger seat or the hinge, the support positioned at a non-zero angle with respect to a section of the passenger seat when the support is in the deployed position.

EC O. A passenger seat, comprising: a seat back having an opening that provides access to an interior of the seat back; a support having a support surface; a hinge pivotally coupling the support to the seat back such that the support moves between a stowed position, in which the support surface is substantially flush with a portion of the seat back, and a deployed position, in which the support surface extends at a non-zero angle with respect to the seat back, wherein the hinge includes a hinge arm having a first end coupled to a movable section of the hinge disposed in the interior of the seat back and a second end coupled to the support, wherein the hinge arm extends through the opening such that the second end is disposed externally of the seat back and causes a gap formed between the hinge arm and the opening in the seat back to vary in size via movement of the support; and a shroud configured to substantially close out the gap when the support is in the deployed position.

In the foregoing description, specific details are set forth to provide a thorough understanding of exemplary embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

The present application may reference quantities and numbers. Unless specifically stated, such quantities and numbers are not to be considered restrictive, but exemplary of the possible quantities or numbers associated with the present application. Also, in this regard, the present application may use the term "plurality" to reference a quantity or number. In this regard, the term "plurality" is meant to be any number that is more than one, for example, two, three, four, five, etc. The term "about," "approximately," etc., means plus or minus 5% of the stated value.

It should be noted that for purposes of this disclosure, terminology such as "upper," "lower," "vertical," "horizontal," "fore," "aft," "inner," "outer," "front," "rear," etc., should be construed as descriptive and not limiting the scope of the claimed subject matter. Further, the use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings.

Throughout this specification, terms of art may be used. These terms are to take on their ordinary meaning in the art from which they come, unless specifically defined herein or the context of their use would clearly suggest otherwise.

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

The embodiments of the invention in which an exclusive property or privilege is claimed are defined as follows:

1. A passenger seat, comprising:
   a seat section defining an interior cavity and an opening that provides access to the interior cavity;
   a support coupled to the seat section and configured to reciprocate between a stowed position and a deployed position; and
   a shroud associated with the seat section, the shroud being movable between a stored position and a close-out position when the support moves between the stowed position and the deployed position, wherein the opening is substantially covered by the shroud when the shroud is in the close-out position.

2. The passenger seat of claim 1, wherein the support includes an outer surface that is flush with the seat section when the support is in the stowed position and is positioned at a non-zero angle with respect to the seat section when the support is in the deployed position.

3. The passenger seat of claim 1, wherein the shroud is disposed substantially within the interior cavity of the seat section in the stored position and extends exteriorly of the seat section in the close-out position.

4. The passenger seat of claim 3, further comprising a hinge configured to pivotally couple the support to the seat section, the hinge including a hinge arm extending though the opening and having a first end pivotally mounted to the seat section and a second end fixed to the support.

5. The passenger seat of claim 4, wherein the hinge arm includes a first contact surface that engages a portion of the shroud when the support is moved to a first intermediate position located between the stowed position and the deployed position, wherein continuous engagement between the first contact surface and the portion of the shroud drives the shroud to move with the hinge arm as the support continues to move from the first intermediate position to the deployed position.

6. The passenger seat of claim 5, wherein the support moves independently of the shroud from the stowed position to the first intermediate position.

7. The passenger seat of claim 5, wherein the hinge arm or the support includes a second contact surface that engages the portion of the shroud when the support is moved to a second intermediate position located between the stowed position and the deployed position, wherein continuous engagement between the second contact surface and the portion of the shroud drives the shroud to move with the hinge arm or the support as the support continues to move from the second intermediate position to the stowed position.

8. The passenger seat of claim 7, wherein the hinge arm includes a curvilinear section that includes the first end, wherein the first curvilinear section nests within the shroud when the shroud is in the stored position, and wherein the first curvilinear section includes at least the first contact surface.

9. The passenger seat of claim 7, wherein the support moves independently of the shroud from the deployed position to the second intermediate position.

10. The passenger seat of claim 1, wherein the support is selected from a group consisting of a tray, a portable electric device (PED) holder, and an arm rest.

11. An assembly, comprising:
    a first part having an opening that provides access interiorly of the first part;
    a second part having a support surface;
    a hinge pivotally coupling the second part to the first part such that the second part is movable between a first position and a second position, the hinge comprising a hinge arm pivotally coupled to the first part at a first end and fixed to the second part at a second end, wherein the hinge arm extends through the opening such that the second end of the hinge arm is disposed externally of the first part; and
    a close-out shroud movable with respect to the first part and configured to partially block said opening when said second part is moved to the second position.

12. The assembly of claim 11, wherein the first part is a passenger seat and the second part is a support selected from the group of supports consisting of an arm rest, a tray table, and a portable electronic device (PED) support, and wherein the first position is a stowed position and the second position is a deployed position.

13. The assembly of claim 12, wherein the hinge arm includes a first contact surface that engages a portion of the close-out shroud when the support is moved to a first intermediate position located between the stowed position and the deployed position, wherein continuous engagement between the first contact surface and the portion of the close-out shroud drives the close-out shroud to move with the hinge arm as the support continues to move from the first intermediate position to the deployed position.

14. The passenger seat of claim 13, wherein the support moves independently of the shroud from the stowed position to the first intermediate position.

15. The assembly of claim 12, wherein the hinge is selected from the group consisting of a free hinge and a torque hinge.

16. The assembly of claim 15, wherein the hinge is a free hinge, and wherein the deployed position is defined by a mechanical stop associated with at least one of the passenger seat or the hinge, the support positioned at a non-zero angle with respect to a section of the passenger seat when the support is in the deployed position.

17. A passenger seat, comprising:
- a seat back having an opening that provides access to an interior of the seat back;
- a support having a support surface;
- a hinge pivotally coupling the support to the seat back such that the support moves between a stowed position, in which the support surface is substantially flush with a portion of the seat back, and a deployed position, in which the support surface extends at a non-zero angle with respect to the seat back,
- wherein the hinge includes a hinge arm having a first end coupled to a section of the hinge disposed in the interior of the seat back and a second end coupled to the support, wherein the hinge arm extends through the opening such that the second end is disposed externally of the seat back, wherein movement of the support to the deployed position causes a gap, which is formed between the hinge arm and structure of the seat back defining the opening in the seat back, to vary in size; and
- a shroud configured to substantially cover the gap when the support is in the deployed position.

* * * * *